(12) United States Patent
Halonen et al.

(10) Patent No.: US 10,464,454 B1
(45) Date of Patent: Nov. 5, 2019

(54) VEHICLE SEAT HAVING MOISTURE SENSING

(71) Applicant: Ford Global Technologies, LLC, Dearborn, MI (US)

(72) Inventors: Aaron Halonen, Brighton, MI (US); Stuart C. Salter, White Lake, MI (US); Paul Kenneth Dellock, Northville, MI (US); David Brian Glickman, Southfield, MI (US); Anthony Richard Walser, Royal Oak, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/043,543

(22) Filed: Jul. 24, 2018

(51) Int. Cl.
| | |
|---|---|
| *B60N 2/90* | (2018.01) |
| *B60N 2/56* | (2006.01) |
| *F24F 3/153* | (2006.01) |
| *G05B 19/042* | (2006.01) |
| *B60N 2/68* | (2006.01) |
| *A47C 7/20* | (2006.01) |

(52) U.S. Cl.
CPC .............. *B60N 2/5621* (2013.01); *B60N 2/90* (2018.02); *F24F 3/153* (2013.01); *G05B 19/042* (2013.01); *A47C 7/20* (2013.01); *B60N 2/686* (2013.01); *B60N 2002/981* (2018.02); *G05B 2219/2614* (2013.01)

(58) Field of Classification Search
CPC ............................... B60N 2/5621; B60N 2/90
USPC ...................................................... 297/180.13
See application file for complete search history.

(56) References Cited

U.S. PATENT DOCUMENTS

| | | | | |
|---|---|---|---|---|
| 5,934,748 | A * | 8/1999 | Faust | B60N 2/5635 297/180.1 |
| 6,109,688 | A * | 8/2000 | Wurz | A47C 7/744 297/180.13 |
| 6,578,910 | B2 | 6/2003 | Andersson et al. | |
| 7,695,062 | B2 * | 4/2010 | Stowe | B60N 2/5621 297/180.1 |
| 2005/0023810 | A1 | 2/2005 | Basir et al. | |
| 2010/0289304 | A1 * | 11/2010 | Sung | B60N 2/002 297/217.2 |
| 2017/0150822 | A1 * | 6/2017 | Ghanei | A47C 21/044 |

FOREIGN PATENT DOCUMENTS

CA 2374425 A1 9/2002

* cited by examiner

*Primary Examiner* — Mark R Wendell
(74) *Attorney, Agent, or Firm* — Vichit Chea; Price Heneveld LLP (57) ABSTRACT

A vehicle seat is provided that includes a seat base, a cushion on the seat base, one or more channels formed in the cushion, and a moisture sensor located in the seat base to sense liquid in the one or more channels. The sensed liquid indicates a wet seat condition which may be used to control usage of the seat and drying of the seat.

16 Claims, 6 Drawing Sheets

VEHICLE SEAT HAVING MOISTURE SENSING

FIELD OF THE INVENTION

The present invention generally relates to vehicle seating, and more particularly relates to a vehicle seat configured with a sensor to sense moisture and a method of sensing liquid on a vehicle seat.

BACKGROUND OF THE INVENTION

Automotive vehicles are commonly equipped with vehicle seats located within the passenger compartment for seating passengers. Vehicle seats typically include a seat base having a foam cushion and a seat cover thereon. The seat covering typically includes stitching and air permeable openings that allow air to pass therethrough. The openings in the cover may also allow moisture and other liquids to penetrate the seat cover. As a result of liquid penetration, the seat may become wet and may be deemed inconvenient for use by a passenger and may be excluded for use by a ride share business. It may be desirable to provide for an enhanced sensor arrangement for sensing moisture on the vehicle seat.

SUMMARY OF THE INVENTION

According to one aspect of the present invention a vehicle seat is provided. The vehicle seat includes a seat base, a cushion on the seat base, one or more channels formed in the cushion, and a moisture sensor located in the seat base to sense liquid in the one or more channels.

Embodiments of the first aspect of the invention can include any one or a combination of the following features:
 the one or more channels are formed on a slope, and wherein the sensor is located near a bottom of the one or more channels;
 the one or more channels comprises a plurality of channels;
 the vehicle seat includes a seat cover having a plurality of liquid permeable openings above the one or more channels;
 the sensor comprises sensing circuitry and an antenna for communicating with a reader;
 the reader comprises a radio frequency transceiver;
 the moisture sensor comprises a capacitive sensor;
 the vehicle seat includes a lighting device for illuminating the seat with a light color indicative of a wet seat condition;
 the vehicle seat includes at least one of a heater and an air flow device, wherein at least one of the heater and air flow device is activated when a wet seat condition is detected; and
 the vehicle seat includes a controller for determining seating availability of the seat based on sensed liquid on the seat.

According to a second aspect of the present invention, a vehicle seat is provided. The vehicle seat includes a seat pan, foam on the seat pan, a cover on the foam, one or more channels formed in the foam, and a moisture sensor located in the seat base to sense liquid in the one or more channels.

Embodiments of the second aspect of the invention can include any one or a combination of the following features:
 the one or more channels are formed on a slope, and wherein the sensor is located near a bottom of the one or more channels;
 the one or more channels comprises a plurality of channels;
 the seat cover has a plurality of liquid permeable openings above the one or more channels;
 the sensor comprises sensing circuitry and an antenna for communicating with a reader, wherein the reader comprises a radio frequency transceiver;
 the moisture sensor comprises a capacitive sensor;
 the seat further comprises a lighting device for illuminating the seat with a light color indicative of a wet seat condition; and
 the vehicle seat further comprises at least one of a heater and an air flow device, wherein at least one of the heater and air flow device is activated when a wet seat condition is detected.

According to a third aspect of the present invention, a method of detecting moisture in a vehicle seat is provided. The method includes the steps of providing a plurality of channels extending through a cushion on a vehicle seat, sensing liquid passing in one or more of the channels with a sensor, and controlling at least one function of the seat based on the detected liquid.

Embodiments of the third aspect of the invention can include the following feature:
 the step of controlling further includes controlling availability of the seat for a passenger based on the detected liquid.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
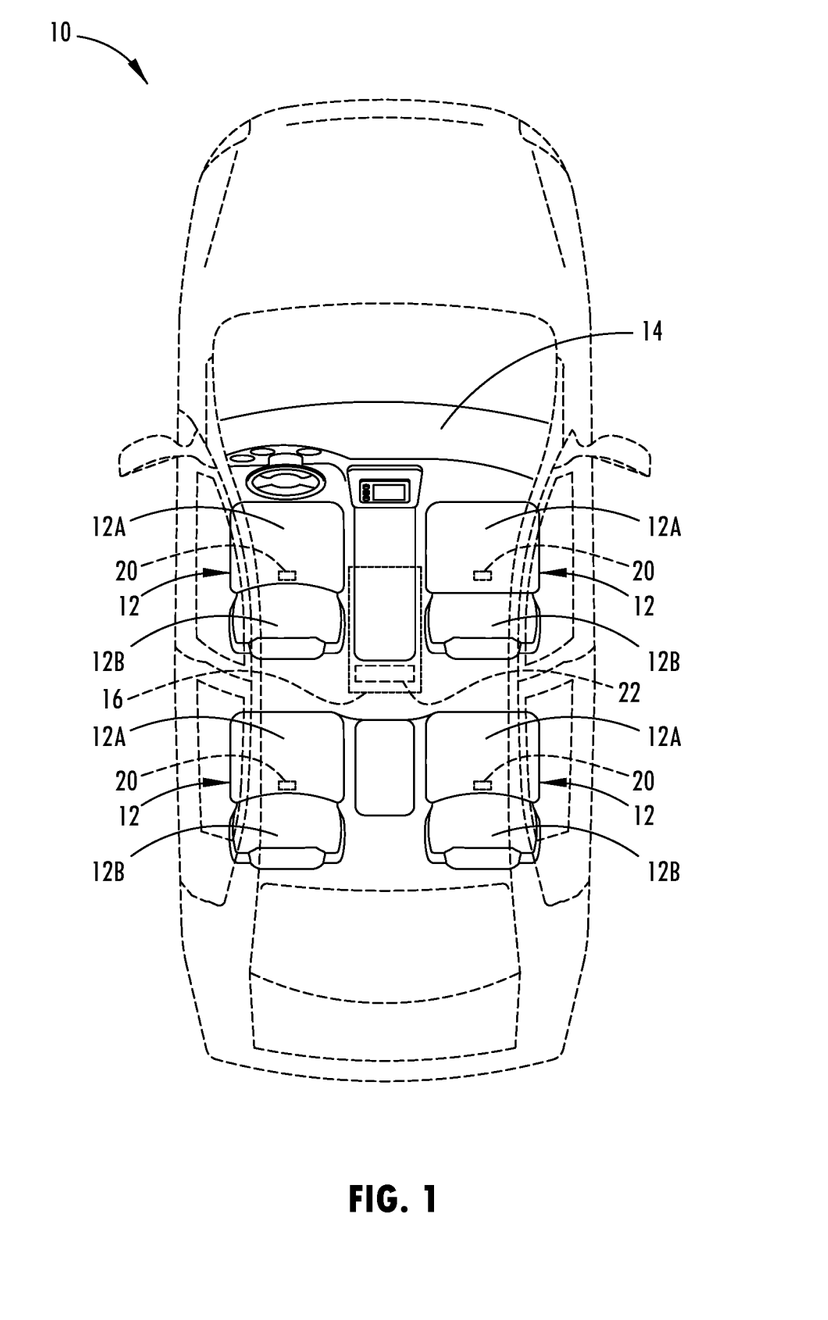
FIG. 1 is a schematic top view of a motor vehicle having vehicle seats configured to sense liquid and hence a wet seat, according to one embodiment.

Referring now to FIG. 1, a motor vehicle 10 is generally illustrated including a passenger compartment 14 having a seating arrangement with passenger seats configured to receive and seat passengers. The motor vehicle 10 may include a wheeled motor vehicle such as a car, a truck, an SUV, a bus, and a van, according to one embodiment. According to other embodiments, the motor vehicle 10 may be configured as a boat, a plane, a train, or other vehicle. The vehicle 10 is configured to sense liquid, such as moisture, on one or more seats 12 and to control use of the seats based on dry or wet conditions, drying of the seat and initiate other actions in response to the detection of liquid on the seats.

The vehicle 10 is shown having a plurality of passenger seats 12 arranged within the passenger compartment 14, according to one exemplary seating arrangement. The vehicle seats 12 are shown having a driver seat and a plurality of passenger seats arranged in two rows, specifically a front row of seats to rear row of seats, according to one embodiment. It should be appreciated that the seating arrangement may otherwise be arranged in various configurations and with various numbers of seats. Additionally, the seating arrangement may include seats that may be oriented in different directions and may move in seating position and/or orientation.

The vehicle seats 12 each include a seat base 12A coupled to a seat back 12B. Located within the seat base 12A of each seat 12 is a moisture sensor 20 for detecting the presence of moisture or other liquid on the seat 12. For example, rain water may enter an open window and wet the seat or a passenger may spill a liquid, such as water or other drink onto the seat 12. The liquid on the seat 12 may penetrate through layers of the seat 12 and may be detected by the moisture sensor 20. When a sufficient amount of moisture indicative of a wet seat condition is detected with the moisture sensor 20 on the seat 12, a controller may take appropriate action. Such action may include one or more actions of warning a passenger about the detected wet seat condition, illuminating a light to indicate the detailed wet seat condition, folding the seat into a folded non-use position to prevent usage of the wet seat, instructing a ride-share company to avoid selling use of the wet seat until the seat is dry, alerting a vehicle management company that the wet seat needs to be dried, and implementing corrective action to dry the wet seat, such as to activate one or both of the seat heating and cooling systems.

According to one embodiment, the moisture sensors 20 located in each of the vehicle seats 12 may communicate with a radio frequency (RF) ID reader 22 which may be located in the vehicle 10 within a distance such as five meters of the moisture sensors 12 to communicate with each of the sensors 12. The RF ID reader 22 may be located in an overhead console, an overhead light assembly, the headliner, the center console, or other locations within the vehicle 10 sufficiently close to enable the RF ID reader 22 to transmit energy to each of the moisture sensors 20 and to receive a signal indicative of sensed liquid from each of the sensors 20.

Figure 2:
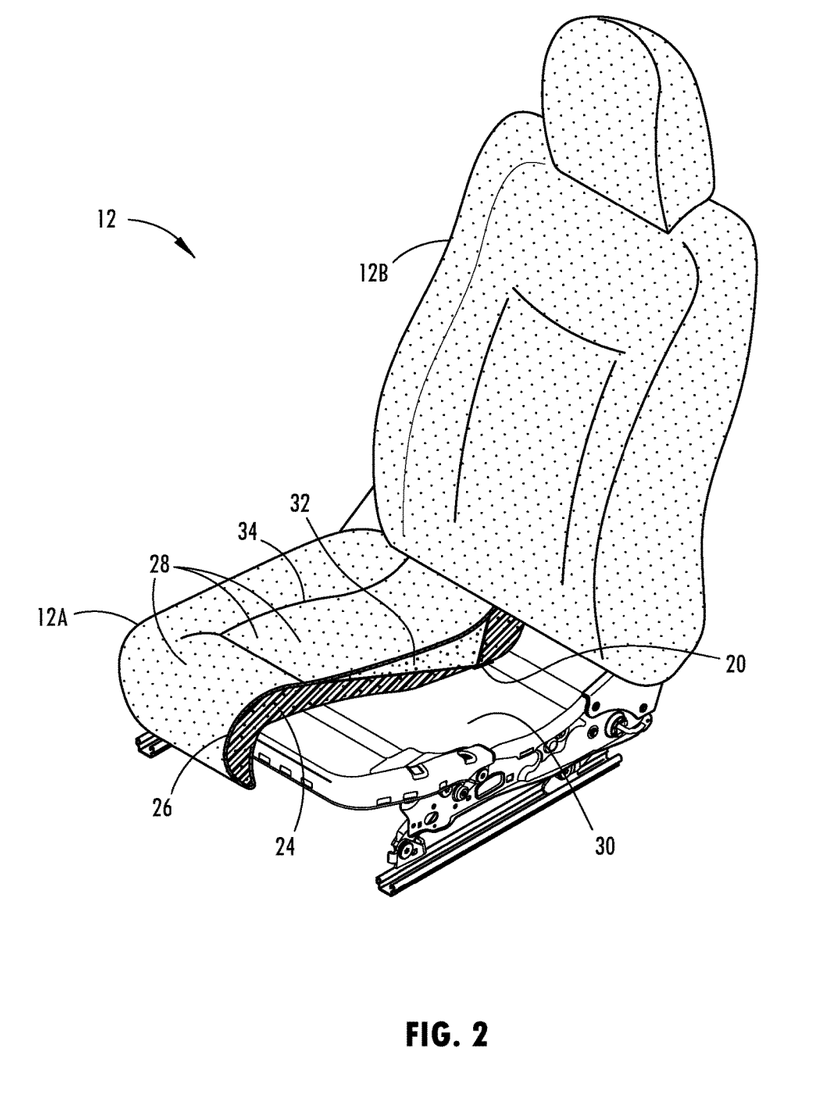
FIG. 2 is an enlarged perspective view of one of the vehicle seats shown in a partial cut-away view illustrating a sensor for sensing liquid within a channel in the foam cushion.
Figure 3:
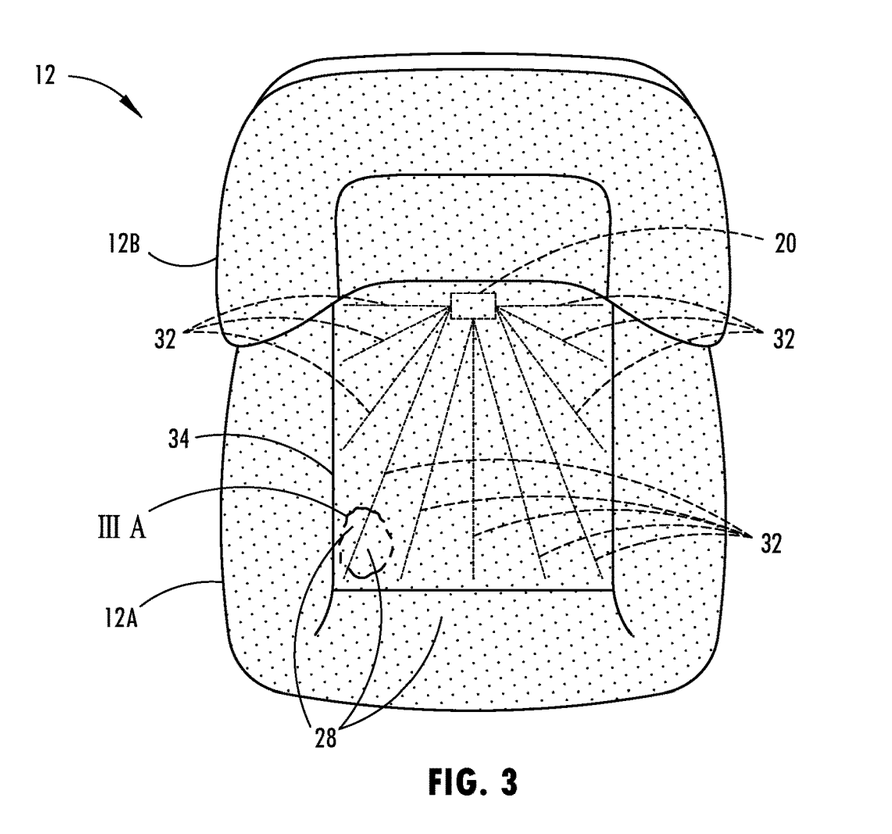
FIG. 3 is a top view of the vehicle seat further illustrating the arrangement of channels in the foam relative to the sensor.
Figure 3A:
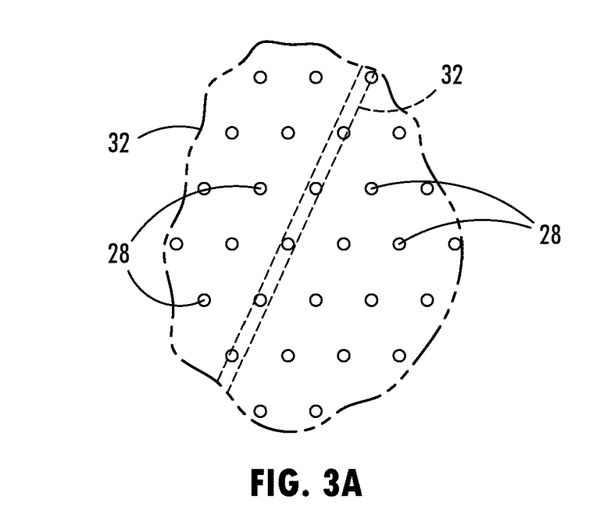
FIG. 3A is an enlarged view of section III of FIG. 3 further illustrating air and liquid permeable holes provided in the seat cover.

Referring to FIG. 2, one of the vehicle seats 12 is illustrated with the seat base 12A shown in a partial cutaway view. Seat base 12A includes an underlying supportive seat structure referred to as a seat pan 30 that generally extends substantially horizontally with a curved upper surface configured with a shaped surface contour to accommodate a seated passenger on the top surface thereof. The seat pan 30 may be made of a polymeric material, according to one embodiment. According to another embodiment, the seat pan 30 may be a suspension seat pan having metal springs suspended over a frame. Disposed on top of the seat pan 30 is a foam material that forms a cushion 24. The cushion 24 extends over the top surface of the seat pan 30 and may extend over the front and side edges thereof. The cushion 24 may be made of an injection molded foam and provides padding for a passenger seated on the seat base 12A. The foam cushion 24 may be air permeable and may be somewhat permeable to moisture, according to one embodiment. A seat cover 26 extends over the top of the cushion 24. The seat cover 26 may include leather, cloth or woven fabric according to various examples. The seat cover 26 has a plurality of air and liquid permeable holes 28 that extend therethrough to allow the seat based 12B to breath. The holes 28 typically may be in the size range sufficient to allow air and liquid to pass therethrough. The holes 28 may allow air to flow in or out of the seat base 12B for heating and/or cooling of the seat. In addition, liquid such as water or spilled beverages may permeate through the holes 28. The seat cover 26 may be stitched onto the foam cushion 24 using stitching 34 in a desired pattern. The seat cover 26 is thereby held onto the foam cushion 24 sufficient to prevent separation of the seat cover 26 from the foam cushion 24.

The vehicle seat 12 is configured to include one or more channels 32 formed in the top surface of the foam cushion 24. In one embodiment, a plurality of channels 32 are formed extending into the top surface of the foam cushion 24. The channels 32 are formed on a slope that extends from an elevated upper end downward towards the seat pan 30 to a lower surface that is further distanced from the seat cover 26. The slope of the channels 34 creates a moisture collection and distribution channel that collects liquid that has penetrated through the cover 26 into the foam cushion 24. Each channel 34 directs the liquid along a path from the underside of the cover 26 to a lower region that draws the liquid via gravity to the lower end of the channel 34. The channels 34 may each have a width in the range of 1.5 to 6.0 mm, according to one embodiment, and more preferably in the range of 2.0 to 4.0 mm. It should be appreciated that the channels 34 may be provided in different numbers of channels 34 and shapes of channels to accommodate the passage of liquid from an upper side of the seat 12 to a lower side of the seat 12.

Positioned at the lower side of each seat 12 at a location where the lower end of the channels 34 are located is a moisture sensor 20 for sensing liquid such as moisture (water), drinks and other liquids. The moisture sensor 20 is positioned so that liquid collected within the channels 34 flows via gravity towards the sensor 20. The moisture sensor 20 may include a capacitive sensor for sensing liquid based on a capacitive electric field, according to one embodiment. According to one specific embodiment, the sensor 20 may be a wireless battery-free moisture sensor which may detect direct contact with liquid, e.g., moisture. According to another embodiment, one or more wicking tails may be employed in liquid communication with one or more channels 34 to wick or draw the liquid to the moisture sensor 20. One example of an off-the-shelf moisture sensor is Model No. RFM2110-BFR, wireless moisture intrusion sensor, commercially available from RF Micron. The battery-free moisture intrusion sensor employs moisture sensing circuitry and an antenna for communicating wirelessly via RF signals with a reader 22. The reader 22 may include a radio frequency transceiver. The radio frequency transceiver may transmit radio frequency (RF) signals to the antenna which may convert the energy of the signal to electrical power to power the sensor 20. The electrical power may charge a capacitive circuit of a capacitive sensor, according to one embodiment. In turn, the sensor 20 may transmit signals indicative of the sensed liquid reading to the reader 22 via the antenna and transceiver. The reader 22 via the radio frequency transceiver may communicate with a controller to provide the sensed liquid level. The controller may initiate one or more actions in response to detected liquid on a vehicle seat 12. It should be appreciated that other moisture or liquid sensors may be employed to sense liquid, including other wireless powered sensors and wired sensors, according to other embodiments.

Figure 4:
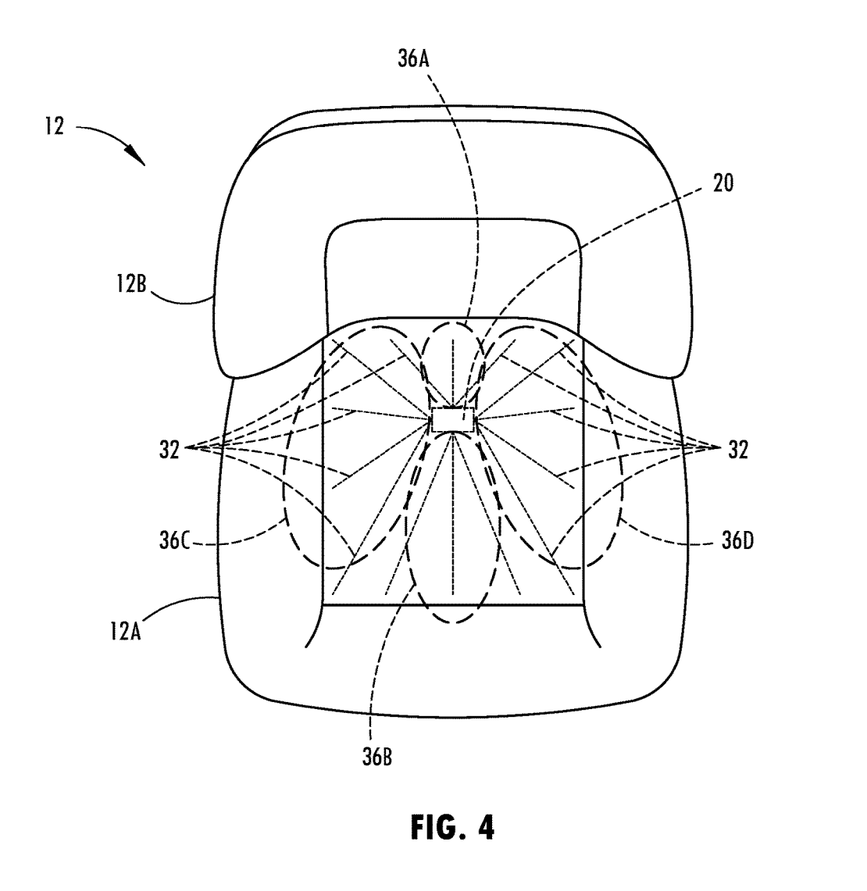
FIG. 4 is a top view of a vehicle seat further illustrating zones of liquid detection sensed with the sensor.

Referring to FIG. 4, the moisture sensor 20 is shown sensing liquid present in four detection zones located proximate to the sensor 20, according to one example. The four exemplary detection zones include zones 36A-36D located generally on four sides of the sensor 20. Sensor 20 may be configured to sense liquid on left and right sides, the top side and a tip side of the sensor 20. The sensor 20 may be oriented in a fore-aft placement with channels 34 in the foam routed toward the tip and top sides. In addition, channels 34 may be routed to the left and right sides of the sensor 20 so as to direct liquid from the channels 34 to the sensor 20. The sensor 20 may have at least five detection states including a no moisture sense state, moisture sensed on one side of the sensor 20, moisture sensed on the opposite side of the sensor 20, moisture sensed on the top side of the sensors 20, and moisture sensed on the tip side of the sensor 20 as indicated by detection zones 36A-36D. In addition, the sensor 20 may have a state in which the sensor 20 is completely submerged in liquid, in which case, there is little or no signal generated. If the sensor 20 is completely submerged in a liquid, the vehicle controller may contact a ride share depot or vehicle management system immediately. It should be appreciated that the seat cover 26 and the channels 34 may be varied to accommodate where the liquid would drain or soak through the seat 12. Thus, the sensor 20 may sense liquid on the seat 12 and may further sense which detection zones contain the sensed liquid. Detection of liquid within a particular detection zone may be detected by processing the signal and action to dry the seat may be directed to drying the one or more detection zones with the liquid.

Figure 5:
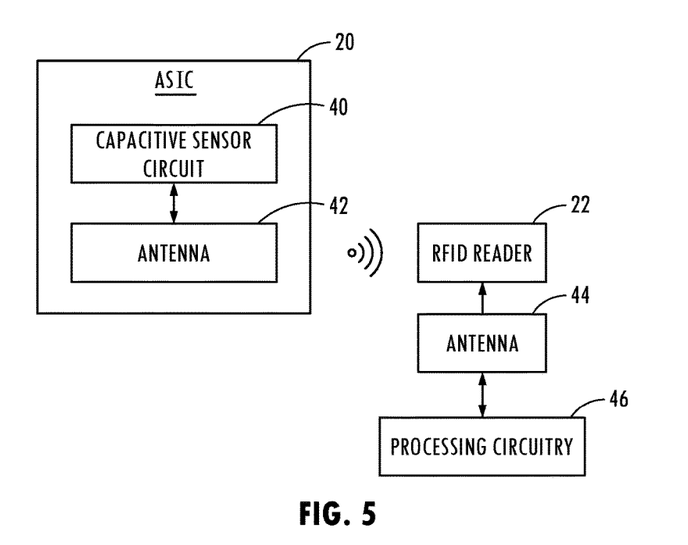
FIG. 5 is a block diagram illustrating the sensor communicating with a radio frequency (RF) ID reader, according to one embodiment.

Referring to FIG. 5, the moisture sensor 20 is shown wirelessly communicating via RF signals with the RFID reader 22. The sensor 20 may include capacitive sensor circuitry 40 and an antenna 42 packaged on an application specific integrated chip (ASIC), according to one embodiment. The reader 22 communicates with the sensor 20 via an antenna 44 and further may communicate with processing circuitry 46 via the antenna 44.

Figure 6:
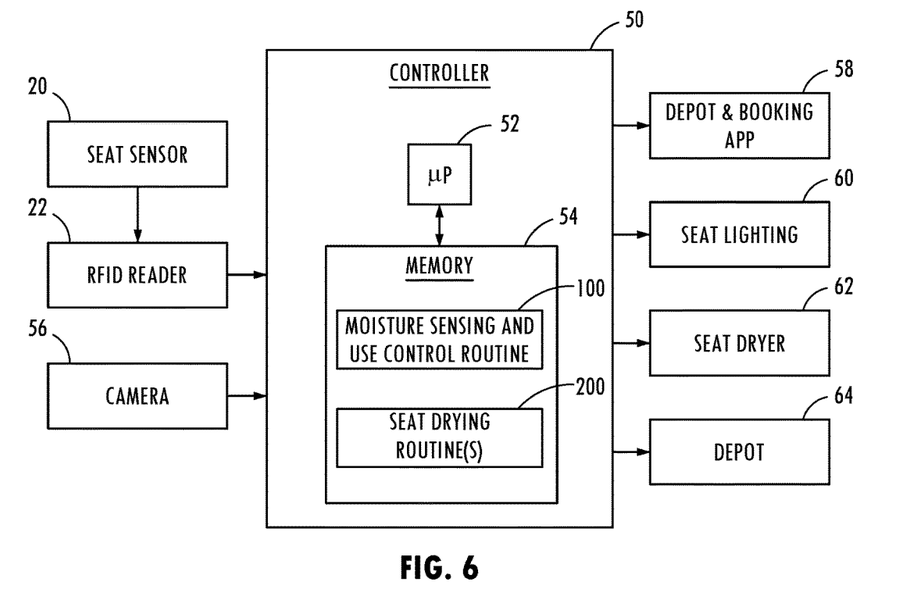
FIG. 6 is a block diagram illustrating the controller arrangement for controlling the sensing of a wet seat and action taken in response thereto.

Referring to FIG. 6, control circuitry for processing the moisture sensing and controlling actions taken in response thereto is illustrated. Included is a controller 50 having a microprocessor 52 and memory 54, according to one embodiment. The controller 50 may include other analog and/or digital circuitry. Stored within memory 54 are control routines including a moisture sensing and use control routine 100 and one or more seat drying routine(s) 200. The moisture sensor 20 communicates with the RF ID reader 22, which, in turn, provides the sensed moisture signal to the controller 50. In addition, a camera 56 located on the vehicle 10 may provide video images of the passenger compartment including images of the seats 12 to the controller 50. The controller 50 processes the signals sensed by the moisture sensor 20 to determine an indication of the liquid detected within each of the seats 12. The controller 50 may then communicate with a ride share depot 64 and/or booking application 58 to schedule the sale of seats for use dependent on which seats are determined to be wet or not. In addition, the controller 50 may provide a signal to seat lighting 60 for each seat 12 which may illuminate the seat 12 to indicate the status of availability of the seat 12 including indicating a wet seat condition. The lighting may be color coded such as a green light to indicate a seat is dry and available and a red light to indicate the seat is wet and unavailable. Controller 50 may also communicate with a seat drying apparatus 62 such as an HVAC fan and/or an electric heater located within the seat. The controller 50 may further communicate directly with the ride share depot 64.

Figure 7:
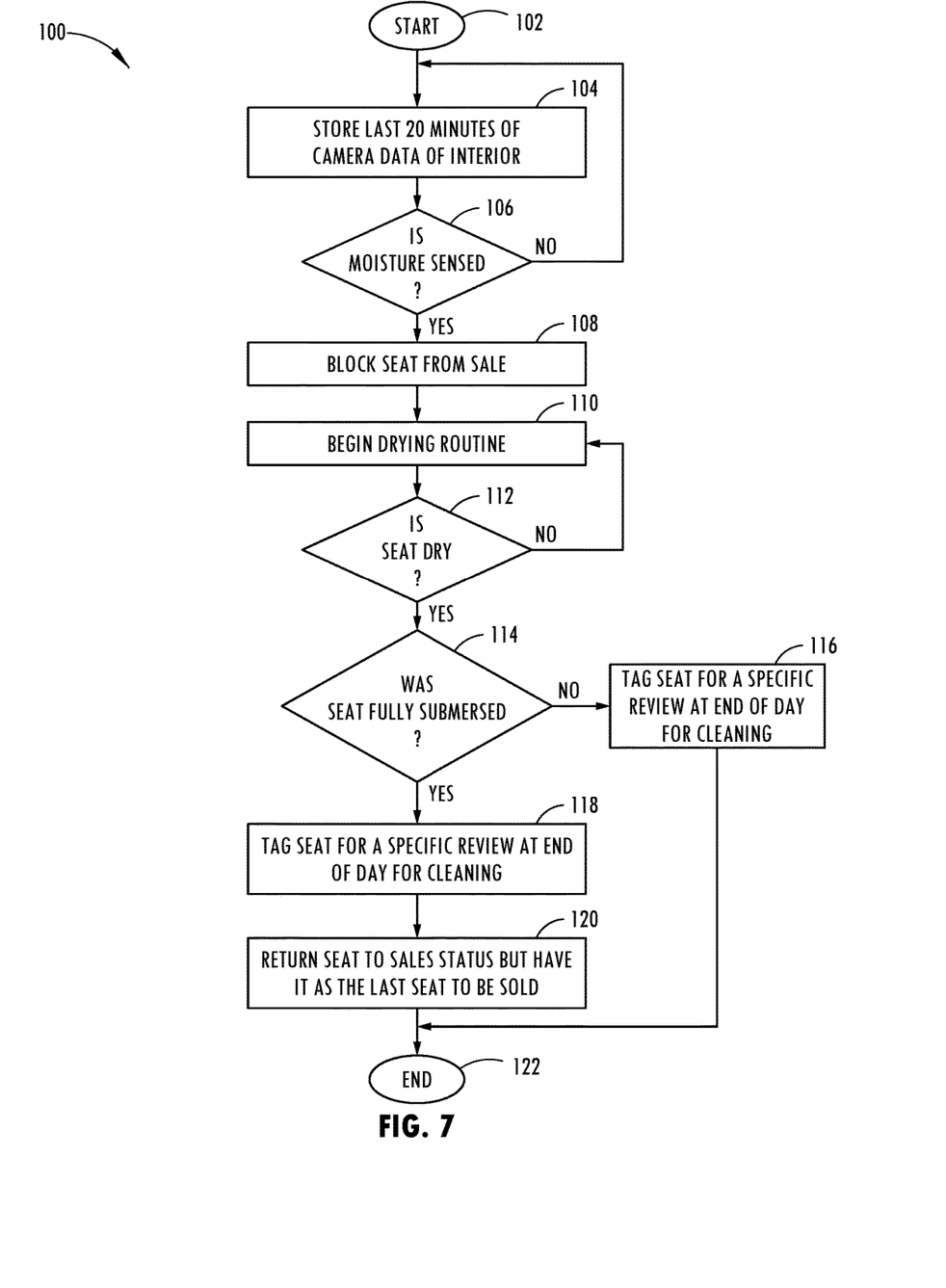
FIG. 7 is a flow diagram illustrating a liquid, e.g., moisture, sensing and use control routine, according to one embodiment.

Referring to FIG. 7, the moisture sensing and use control routine 100 is illustrated according to one embodiment. Routine 100 begins at step 102 and proceeds to step 104 to store the last twenty (20) minutes of camera data e.g., video images, shown illuminating the interior of the vehicle and the seats 12. Next, at decision step 106, routine 100 determines if liquid (e.g., moisture) is sensed on a seat and, if not, returns to step 104. If moisture or other liquid is sensed on a seat, a wet seat condition exists and routine 100 proceeds to step 108 to block that seat from sale for a ride share application or use by a passenger and then to step 110 to begin the drying routine to dry the seat in an attempt to remove the moisture. Next, at decision step 112, routine 100 will determine whether the seat is dry and, if not, will continue with the drying routine. Once the seat is dry, routine 100 will proceed to decision step 114 to determine if the seat was fully submerged in liquid and, if so, will tag the seat for specific review at the end of the day for cleaning at step 118, and thereafter will return the seat to ride share sale status but tag or designate it as the last seat to be sold for use at step 120 before ending at step 122. If the seat was not fully submerged in liquid, routine 100 will proceed to step 116 to tag the seat for a specific review at the end of the day for cleaning.

It should be appreciated that the seat drying routine may include one or more routines for drying the seat 12 including activating a seat heater to heat the seat 12. Alternatively, or in addition, the seat drying routine may include activating a fan in the seat or other blower to blow forced air through the seat, such as cool air for cooling the seat or ventilated air passing through the holes in the seat cover. Other steps taken to dry the seat 12 may include increasing the air flow within the passenger compartment of the vehicle 10 with an HVAC blower system or opening the windows and/or opening the moonroof when environmental conditions, such as temperature and rain are appropriate.

Accordingly, the vehicle seat 12 advantageously detects a wet seat having liquid on the vehicle seat 12 by providing one or more channels 34 formed in the foam cushion to direct moisture or other liquid to a moisture sensor 20 in the seat 12 so as to detect moisture on the seat and takes corrective steps to dry the seat and control use of the seat. Usage of the seat for a ride share application may advantageously be controlled based on a detected wet seat condition.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
   a seat base;
   a cushion on the seat base;
   one or more channels formed in the cushion; and
   a moisture sensor located in the seat base to sense liquid in the one or more channels, wherein the sensor comprises sensing circuitry and an antenna for communicating with a reader.

2. The vehicle seat of claim 1, wherein the one or more channels are formed on a slope, and wherein the sensor is located near a bottom of the one or more channels.

3. The vehicle seat of claim 1, wherein the one or more channels comprises a plurality of channels.

4. The vehicle seat of claim 1 further comprising a seat cover having a plurality of liquid permeable openings above the one or more channels.

5. The vehicle seat of claim 1, wherein the reader comprises a radio frequency transceiver.

6. The vehicle seat of claim 1, wherein the moisture sensor comprises a capacitive sensor.

7. The vehicle seat of claim 1, wherein the vehicle seat further comprises at least one of a heater and an air flow device, wherein at least one of the heater and air flow device is activated when a wet seat condition is detected.

8. The vehicle seat of claim 1 further comprising a controller for determining seating availability of the seat based on sensed liquid on the seat.

9. A vehicle seat comprising:
a seat base;
a cushion on the seat base;
one or more channels formed in the cushion;
a moisture sensor located in the seat base to sense liquid in the one or more channels; and
a lighting device for illuminating the seat with a light color indicative of a wet seat condition.

10. A vehicle seat comprising:
a seat pan;
foam on the seat pan;
a cover on the foam;
one or more channels formed in the foam; and
a moisture sensor located on the seat pan to sense liquid in the one or more channels, wherein the sensor comprises sensing circuitry and an antenna for communicating with a reader, wherein the reader comprises a radio frequency transceiver.

11. The vehicle seat of claim 10, wherein the one or more channels are formed on a slope, and wherein the sensor is located near a bottom of the one or more channels.

12. The vehicle seat of claim 10, wherein the one or more channels comprises a plurality of channels.

13. The vehicle seat of claim 10, wherein the seat cover has a plurality of liquid permeable openings above the one or more channels.

14. The vehicle seat of claim 10, wherein the moisture sensor comprises a capacitive sensor.

15. The vehicle seat of claim 10, wherein the seat further comprises a lighting device for illuminating the seat with a light color indicative of a wet seat condition.

16. The vehicle seat of claim 10, wherein the vehicle seat further comprises at least one of a heater and an air flow device, wherein at least one of the heater and air flow device is activated when a wet seat condition is detected.

* * * * *